United States Patent [19]

Nozawa et al.

[11] Patent Number: 4,549,271
[45] Date of Patent: Oct. 22, 1985

[54] MEASUREMENT METHOD BY NUMERICAL CONTROL DEVICE

[75] Inventors: Ryoichiro Nozawa, Tokyo; Nobuyuki Kiya, Hachioji; Akio Ichimura, Hino, all of Japan

[73] Assignee: Fanuc Limited, Minamitsuru, Japan

[21] Appl. No.: 464,495

[22] PCT Filed: May 27, 1982

[86] PCT No.: PCT/JP82/00200
§ 371 Date: Jan. 27, 1983
§ 102(e) Date: Jan. 27, 1983

[87] PCT Pub. No.: WO82/04312
PCT Pub. Date: Dec. 9, 1982

[30] Foreign Application Priority Data

May 29, 1981 [JP] Japan .................... 56-082895

[51] Int. Cl.$^4$ .................. G01B 21/00; G05B 19/42
[52] U.S. Cl. .................... 364/474; 364/167; 318/603; 377/17; 33/125 M; 33/142
[58] Field of Search .............. 364/167–171, 364/174, 474, 513, 561, 562; 318/601, 602, 603; 33/125 L, 125 M, 142, 1 M; 377/17, 24

[56] References Cited

U.S. PATENT DOCUMENTS 3,828,238  8/1974  Kobayashi et al. ............ 318/603 X
4,374,351  2/1983  Fishman et al. ............... 318/603 X
4,376,970  3/1983  Ilseman et al. ............... 318/603 X

FOREIGN PATENT DOCUMENTS 49-31058  3/1974  Japan .

Primary Examiner—Jerry Smith
Assistant Examiner—Allen MacDonald
Attorney, Agent, or Firm—Staas & Halsey

[57] ABSTRACT

Disclosed is a measurement method performed by a numerical control device measurement apparatus having a device for computing and storing the difference between a number of feedback pulses, each of which is generated whenever a movable element moves by a predetermined amount, and a number of command pulses ($P_s$) generated by a pulse distributor, a motor being controlled in such a manner that said difference approaches zero. Specifically, the measurement method includes counting, by the storage and computing means sensor pulses (MP) generated by a sensor, reading the counted value in the storage and computing device and applying the same to the pulse distributor as a command, computing and storing, by the storage and computing device, the difference between the number of sensor pulses (MP) and the number of distributed pulses ($P_s$) generated by the pulse distributor, reading the content of the storage and computing device each time distributed pulses of a number equivalent to the counted value are generated and applying the read value to the pulse distributor as a command, and measuring the total number of sensor pulses by computing the total sum of the counted values read from the storage and computing device.

3 Claims, 3 Drawing Figures

MEASUREMENT METHOD BY NUMERICAL CONTROL DEVICE

BACKGROUND OF THE INVENTION

This invention relates to a measurement method performed by a numerical control device and, more particularly, to a measurement method through which, e.g., the amount of travel of an object can be measured by finding the total number of measurement pulses generated by a sensor.

A numerical control device generates distributed pulses (command pulses) by performing a pulse distribution operation based on the magnitude of a move command input from an NC tape or the like, and drives a motor on the basis of these pulses. The motor is controlled in such a manner that the difference between the number of distributed pulses and a number of feedback pulses, each of which is generated whenever a movable element such as the motor or a table rotates or travels by a predetermined amount, approaches zero, whereby positioning control or continuous cutting control is performed.

FIG. 1 is a block diagram of such a numerical control system. In FIG. 1, numeral 101 denotes a paper tape in which NC command data is punched. Numeral 102 denotes a control unit which causes a tape reader (not shown) to read in the NC data from the paper tape 101, and which decodes the read NC data, delivering, e.g., M, S and T function commands to the machine side through a heavy current switchboard and a move command $X_c$ to a pulse distributor, which is in a succeeding stage. Numeral 103 denotes the pulse distributor (PD), which executes well-known pulse distribution computations on the basis of the move command $X_c$, and generates distributed pulses $P_s$ at a frequency corresponding to a commanded speed. Numeral 104 designates a known accelerator/decelerator circuit (ACC/DEC) which generates a train of pulses $P_i$ by rectilinearly accelerating the pulse rate of the train of distributed pulses $P_s$ at the beginning of a pulse train and by rectilinearly decelerating the same at the end thereof. Numeral 105 indicates a D.C. motor (M) by which a table TB or tool is driven. Numeral 106 denotes a pulse coder (PC) which generates one feedback pulse FP each time the DC motor 105 rotates by a predetermined amount. Numeral 107 denotes an error calculating and storing unit (ERR) which is constructed of, for example, a reversible counter, and which stores the difference $E_r$ between the number of the input pulses $P_i$ received from the accelerator/decelerator circuit 104 and that of the feedback pulses FP. This error calculating and storing unit may be constructed, as shown in the Figure, of an arithmetic circuit 107a for calculating the difference $E_r$ between the numbers of the pulses $P_i$ and FP, and an error register (REG) 107b for storing the error $E_r$. More specifically, assuming that the DC motor 105 is rotating in the + direction, the error calculating and storing unit 107 operates in such a manner that each time the input pulse $P_i$ is generated, the content is counted up, while each time the feedback pulse FP is generated, the content is counted down, and that the difference $E_r$ between the number of input pulses and the feedback pulses is stored in the error register 107b. Numeral 108 denotes a digital-to-analog (DA) converter for generating an analog voltage proportional to the content of the error register 107b, and numeral 109 a speed control circuit (SC).

When the control unit 102 produces the move command $X_c$, the pulse distributor 103 executes the pulse distribution computation and provides the distributed pulses $P_s$. Upon receiving the pulses $P_s$, the accelerator/decelerator circuit 104 accelerates and decelerates the pulse rate thereof and applies the train of command pulses $P_i$ to the error calculating and storing circuit 107. Thus, the content of the error register 107b becomes non-zero, so that the DA converter 108 provides a voltage and the motor 105 is driven by the speed control circuit 109 so as to move the table TB. When the motor 105 has rotated by a predetermined amount, the feedback pulse FP is generated by the pulse coder 106 and is applied to the error calculating and storing unit 107. The difference $E_r$ between the number of commanded pulses $P_i$ and the number of feedback pulses FP is stored in the error register 107b. Thenceforth, the table TB is servo-controlled so as to make the difference $E_r$ approach zero, whereby the table TB is moved toward a target position or along a commanded path and then brought to a stop.

There are instances where a user may wish to employ the above-described numerical control device as a measuring device. For example, a user may wish to measure the travelling distance of an object, length, bore depth, or the number of pulses generated by a sensing element. Heretofore, however, numerical control devices have not been applied to the measurement of physical quantities.

Accordingly, an object of the present invention is to provide a novel measurement method through which a numerical control device having the construction shown in FIG. 1 can be utilized as a measuring device.

SUMMARY OF THE INVENTION

Disclosed is a measurement method performed by a numerical control device having a device for computing and storing the difference between a number of feedback pulses each of which is generated whenever a movable element moves by a predetermined amount, and a number of command pulses generated by a pulse distributor, a motor being controlled in such a manner that said difference approaches zero. Specifically, the measurement method includes the steps of counting sensor pulses generated by a sensor, applying the counted value to a pulse distributor as a command, computing and storing the difference between a number of distributed pulses generated by the pulse distributor and the number of sensor pulses, and reading the difference between the number of distributed pulses and the number of sensor pulses each time the commanded number of distributed pulses is generated and reapplying the difference to the pulse distributor as a command, the total number of sensor pulses being measured by repeating the above-mentioned steps and computing the total sum of the read differences.

DESCRIPTION OF THE PREFERRED EMBODIMENTS

Embodiments of the present invention will now be described in detail with reference to the drawings.

Figure 1:
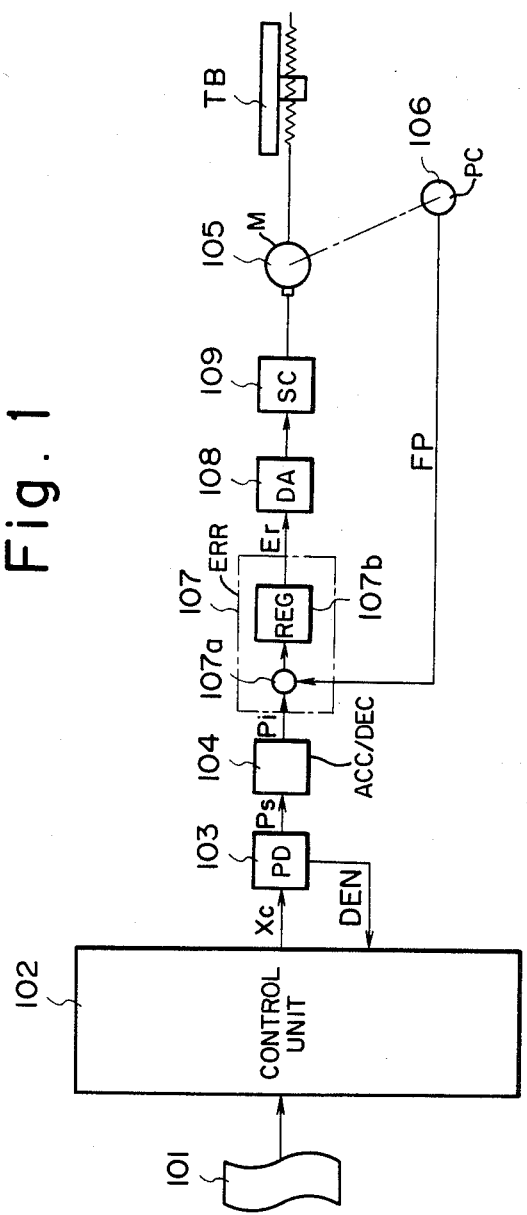
FIG. 1 is a block diagram of a numerical control system.
Figure 2:
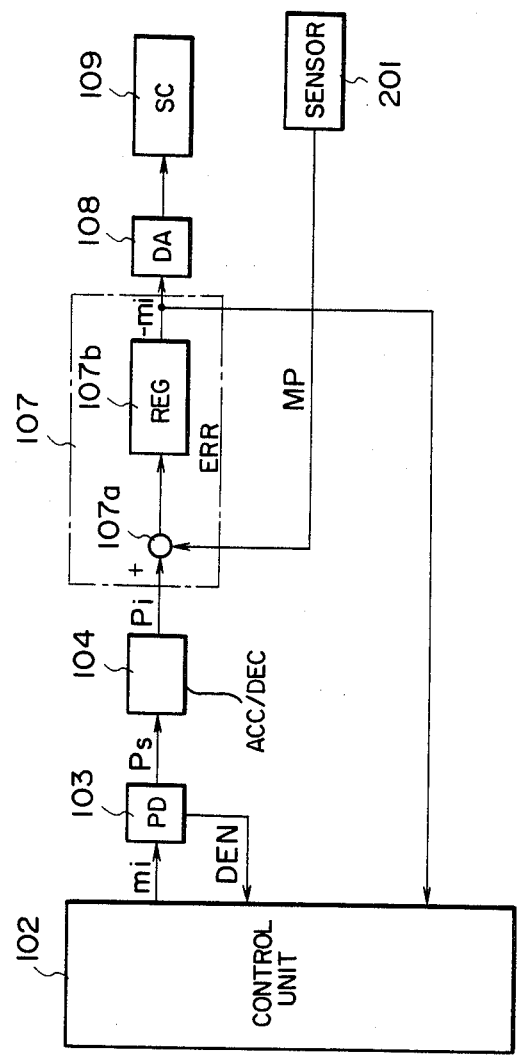
FIGS. 2 and 3 are block diagrams of embodiments of the present invention.

FIG. 2 is a block diagram for practicing a measurement method in accordance with the present invention, in which portions similar to those shown in FIG. 1 are designated by like reference characters and are not described in detail again. In FIG. 2, reference numeral 201 denotes a measuring device or sensor which, it will be assumed, generates one measurement pulse MP each time an object (not shown) moves by a predetermined amount or unit distance. A case where the travelling distance of the object is measured will be described next.

When the object moves, the sensor 201 generates one measurement pulse MP each time the object travels the predetermined distance. The content of the error register 107b is updated by being decremented by −1 each time the measurement pulse MP is generated. Accordingly, if we assume that the content of the error register 107b initially is zero, then its content will be decremented to −$m_1$ by the generation of $m_1$-number of measurement pulses. The −$m_1$ content is read by the control unit 102, which then performs the operation:

$$M + m_1 \rightarrow M \tag{1}$$

where the initial value of M is zero. In addition, the content of error register 107b is applied to the pulse distributor 103 after its sign is changed. When $m_1$ is commanded, the pulse distributor 103 immediately performs a pulse distribution operation to produce the distributed pulses $P_s$. The distributed pulses $P_s$ are converted into the command pulses Pi via the accelerator/decelerator circuit 104. These pulses are applied to the error computing and storing unit 107, the content of the error register 107b being updated by one in the positive direction each time a pulse $P_i$ arrives. The error computing and storing unit 107 concurrently receives the measurement pulses MP. These pulses update the error register 107b by one in the negative direction each time one of them arrives. Accordingly, if we assume that the time at which the content −$m_1$ is read out of error register 107b is $t_1$, that the time at which the $m_1$-number of distributed pulses $P_s$ is generated is $t_2$, and that $m_2$-number of measurement pulses MP are generated between times $t_1$ and $t_2$, then the content of error register 107b at time $t_2$ will be −$m_2$.

The pulse distributor 103, upon producing the number of distributed pulses $P_s$ commensurate with the magnitude of the command, issues a signal DEN indicative of the end of the pulse distribution operation. The control unit 102 responds to the pulse distribution end signal DEN by once again reading the content (−$m_2$) of the error register 107b, whereupon the control unit performs the addition:

$$M + m_2 \rightarrow M \tag{1'}$$

In addition, $m_2$ is applied to the pulse distributor 103. Owing to the operation (1') above, M becomes ($m_1 + m_2$). Thenceforth, each time the pulse distribution end signal DEN is generated, the positional control unit 102 reads the content −$m_i$ ($i = 1,2,3...$) of the error register 107b, the following addition is performed:

$$M + m_i \rightarrow M \; (= \Sigma m_i) \tag{1''}$$

and the numerical value $M_i$ is applied to the pulse distributor 103. When the measurement pulses MP stop arriving from the measuring device 201, that is, when the object reaches the target position and the content of the error register 107b becomes zero, M will be equal to the total number of measurement pulses MP.

The foregoing is summarized by the following table:

| Time | t1 | t2 | t3 | — | ti | — | tj | tj + 1 |
|---|---|---|---|---|---|---|---|---|
| Number of pulses MP generated | $m_1$ | $m_2$ | $m_3$ | .. | $m_i$ | .. | $m_j$ | 0 |
| Number of pulses Ps generated | 0 | $m_1$ | $m_2$ | .. | $m_{i+1}$ | .. | $m_{j+1}$ | $m_j$ |
| Content of error register | −$m_1$ | −$m_2$ | −$m_3$ | .. | −$m_i$ | .. | −$m_j$ | 0 |

It should be noted that t1 is the time at which the content of error register 107b is initially read, ti ($i = 2,3...$) is the time at which the pulse distribution end signal is generated, and $m_i$ represents the number of measurement pulses produced between time $t_{i-1}$ and time ti. It will be appreciated from the table that the total number M of measurement pulses MP may be expressed by the following:

$$M = \sum_{i=1}^{j+1} m_i$$

which is precisely in agreement with the sum total exhibited by the error register 107b. It is apparent that the total sum of the commanded values applied to the pulse distributor 103 may be taken as M.

Figure 3:
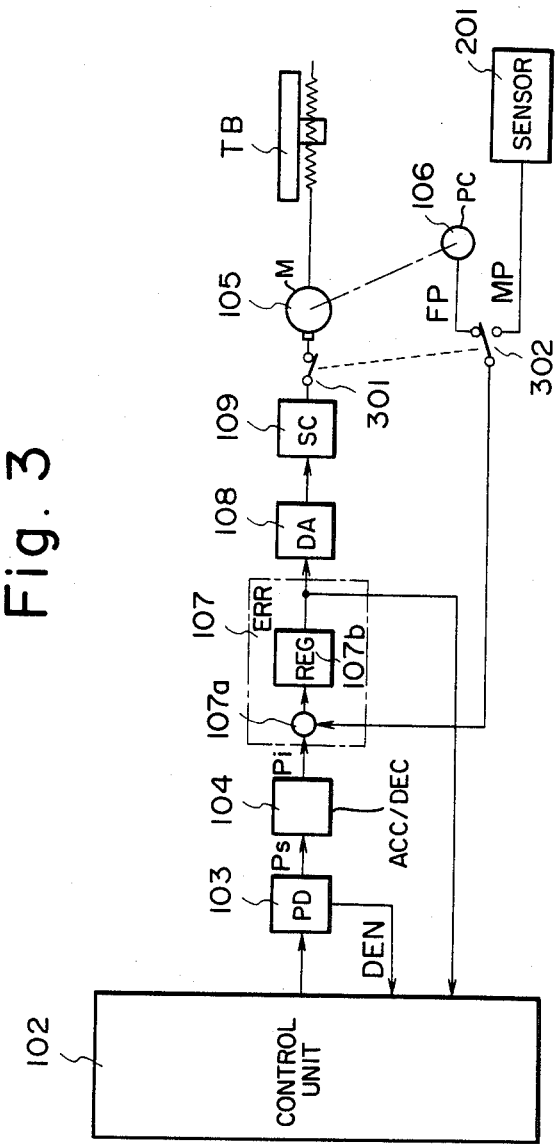

FIG. 3 is a block diagram of the present invention for a case where changeover means such as a switch is provided so that the invention may be employed as either an NC device or measuring device. Portions similar to those shown in FIGS. 1 and 2 are designated by like reference characters. In FIG. 3, numerals 301, 302 denote interlocked changeover switches, the manipulation whereof permits the arrangement to be used selectively as an NC device or measuring device.

It should be noted that the data in the error register 107b is read into the control unit 102 in response to a so-called user macro instruction.

In accordance with the present invention as described above, a numerical control device can be used as a measuring device for measuring travelling distance or the like, without modifying the hardware of the device. By providing switching means such as a switch or the like, the arrangement of the invention can be used as a numerical control device or as a measuring device. Further, according to the present invention, by employing a user macro instruction in the arrangement of the NC device, the travelling distance of a movable element such as a motor or table can be sensed even when the movable element is moved without a command from the NC program. Thus the present position of a machine and the content of a present position register can be made to agree (referred to as follow-up).

The present invention is well-suited for use in measuring the travelling distance of an object, length, bore depth or the number of pulses generated by a sensing element.

We claim:

1. A measurement method performed by a numerical control device having difference means for counting, computing and storing the difference between a number of sensor pulses each of which is generated by a sensor whenever a movable element moves by a predetermined amount, and a number of command pulses generated by a pulse distributor, a motor being controlled in such a manner that said difference approaches zero, comprising the steps of:

(1) counting the sensor pulses generated by the sensor;
   (2) applying the counted values to the pulse distributor as a command;
   (3) computing, by said difference means, the difference between the number of command pulses generated by the pulse distributor and the number of sensor pulses;
   (4) applying said difference to the pulse distributor as a command after the generation of the number of command pulses equivalent to said counted value;
   (5) executing a pulse distribution operation to said motor based on said difference and repeating steps (3) and (4); and
   (6) computing the total sum of said difference, the total sum of said difference serving as the total number of generated sensor pulses.

2. A measurement method performed by the numerical control device according to claim 1, wherein said numerical control device further includes means for generating feedback pulses and switching means for selectively delivering to said difference means the sensor pulses generated by said sensor or said feedback pulses.

3. A numerical control measurement apparatus for measuring the movement of a movable element, comprising:

a sensor generating a movement signal for each unit distance of movement by the movable element;
   error calculating and storing means, operatively connected to said sensor, for generating a movement difference signal; and
   computing means, operatively connected to said error calculating and storing means, for summing the difference signals and applying an inverted difference signal to said error calculating and storing means, said error calculating and storing means generating as the movement difference signal the difference between the inverted difference signal and the movement signal.

* * * * *

UNITED STATES PATENT AND TRADEMARK OFFICE
CERTIFICATE OF CORRECTION

PATENT NO. : 4,549,271

DATED : October 22, 1985

INVENTOR(S) : RYOICHIRO NOZAWA ET AL.

It is certified that error appears in the above-identified patent and that said Letters Patent is hereby corrected as shown below:

The Title should be --Measurement Method By A Numerical Control Device And An Apparatus Therefor--.

[57] Abstract, line 10, "means" should be --device--.

Col. 1, Title, after "BY" insert --A--;

after "DEVICE" insert --AND AN APPARATUS THEREFOR--.

Col. 6, line 1, "difference" should be --differences--;

line 2, "difference" should be --differences--.

Signed and Sealed this

Eighteenth Day of February 1986

[SEAL]

Attest:

DONALD J. QUIGG

Attesting Officer

Commissioner of Patents and Trademarks